United States Patent
Nathani

(10) Patent No.: US 11,379,780 B2
(45) Date of Patent: Jul. 5, 2022

(54) COMPUTER IMPLEMENTED APPRAISAL SYSTEM AND METHOD THEREOF

(71) Applicant: CYBAGE SOFTWARE PRIVATE LIMITED, Pune (IN)

(72) Inventor: Arun Vijay Nathani, Maharashtra (IN)

(73) Assignee: CYBAGE SOFTWARE PRIVATE LIMITED, Pune (IN)

(*) Notice: Subject to any disclaimer, the term of this patent is extended or adjusted under 35 U.S.C. 154(b) by 93 days.

(21) Appl. No.: 16/630,172

(22) PCT Filed: Jul. 11, 2018

(86) PCT No.: PCT/IB2018/055098
§ 371 (c)(1),
(2) Date: Jan. 10, 2020

(87) PCT Pub. No.: WO2019/012438
PCT Pub. Date: Jan. 17, 2019

(65) Prior Publication Data
US 2020/0134535 A1 Apr. 30, 2020

(30) Foreign Application Priority Data
Jul. 11, 2017 (IN) .............................. 201721024463

(51) Int. Cl.
G06Q 10/06 (2012.01)
(52) U.S. Cl.
CPC . G06Q 10/06398 (2013.01); G06Q 10/06393 (2013.01)
(58) Field of Classification Search
None
See application file for complete search history.

(56) References Cited

U.S. PATENT DOCUMENTS

| 6,338,042 B1* | 1/2002 | Paizis | G06Q 10/10 705/7.37 |
| 2003/0130886 A1* | 7/2003 | Calderaro | G06Q 10/10 705/7.14 |

(Continued)

FOREIGN PATENT DOCUMENTS

IN 352MUM2012 A 8/2013

OTHER PUBLICATIONS

Kalinowska, "Bonus distribution for employees of a telephone customer service department: a case study based on pairwise comparisons," 2014, Procedia Computer Science vol. 35m, pp. 1145-1154 (Year: 2014).*

(Continued)

*Primary Examiner* — Ivan R Goldberg
(74) *Attorney, Agent, or Firm* — Blueshift IP, LLC; Robert Plotkin

(57) ABSTRACT

The present disclosure relates to a computer implemented appraisal system (100). A repository (102) stores a set of pre-defined organization rules, a lookup table having a list of employees, and actual emoluments, computed historical appraisal score values, employee details, and a set of pre-determined parameters corresponding to each of the employees, and a predicted weightage corresponding to each of the set of pre-determined parameters. An analyzer (104) analyzes the stored employee details to generate a plurality of clusters of employees. A matrix creator (106b) creates a matrix for each of the pre-determined parameters, and populates each cell of the created matrix with a rating value by comparing a score value of each of the employees associated with the cell. A ranking module (106a) generates a rank value for each of the employees. A validation module (110) identifies an error or a bias. A computation module (112) computes emoluments for each of the employees.

6 Claims, 4 Drawing Sheets

(56) References Cited

U.S. PATENT DOCUMENTS

| | | | | |
|---|---|---|---|---|
| 2004/0210475 A1* | 10/2004 | Starnes | ............... | G06Q 10/105 |
| | | | | 705/320 |
| 2006/0224530 A1* | 10/2006 | Riggs | ...................... | G06N 7/00 |
| | | | | 706/14 |
| 2009/0055382 A1* | 2/2009 | Kerschbaum | .......... | G06Q 10/06 |
| 2010/0114672 A1* | 5/2010 | Klaus | ............ | G06Q 10/063112 |
| | | | | 705/7.14 |
| 2010/0121685 A1* | 5/2010 | Mahadevan | ..... | G06Q 10/06393 |
| | | | | 705/7.39 |
| 2011/0184783 A1* | 7/2011 | Roman Stoica | ... | G06Q 10/0639 |
| | | | | 705/7.38 |
| 2013/0204674 A1* | 8/2013 | Nathani | ................. | G06Q 10/06 |
| | | | | 705/7.42 |
| 2014/0074565 A1* | 3/2014 | Green | ............. | G06Q 10/06398 |
| | | | | 705/7.42 |
| 2018/0046967 A1* | 2/2018 | Ghosh | ............. | G06Q 10/06393 |

OTHER PUBLICATIONS

International Search Report and Written Opinion of the International Searching Authority, dated Oct. 24, 2018, International patent application No. PCT/IB2018/055098, 8 pages.

Islam, Rafikul et al., "Employee Performance Evaluation by the AHP: A Case Study," Jan. 2006, 17 pages, available online at <URL:https://www.researchgate.net/publication/292437577_Employee_performance_evaluation_by_the_AHP_A_case_study>.

* cited by examiner

COMPLETE SPECIFICATION

| | Employee1 | Employee2 | Employee3 | Employee4 | Employee5 |
|---|---|---|---|---|---|
| Employee1 | ■ | < ▼ | > ▼ | < ▼ | = ▼ |
| Employee2 | > | ■ | < ▼ | = ▼ | < ▼ |
| Employee3 | < | > | ■ | = ▼ | > ▼ |
| Employee4 | > | = | = | ■ | > ▼ |
| Employee5 | = | > | < | < | ■ |

Select Parameter | Discipline ∨

FIGURE 2A

| | Employee1 | Employee2 | Employee3 | Employee4 | Employee5 |
|---|---|---|---|---|---|
| Employee1 | | > ▼ | > ▼ | = ▼ | = ▼ |
| Employee2 | < | | < ▼ | = ▼ | < ▼ |
| Employee3 | < | > | | = ▼ | > ▼ |
| Employee4 | = | = | = | | > ▼ |
| Employee5 | = | > | < | < | |

Select Parameter: Attentiveness

FIGURE 2B

COMPUTER IMPLEMENTED APPRAISAL SYSTEM AND METHOD THEREOF

FIELD

The present disclosure relates to the field of automated appraisal systems.

DEFINITIONS

As used in the present disclosure, the following terms are generally intended to have the meaning as set forth below, except to the extent that the context in which they are used indicates otherwise.

The term "actual emoluments" used hereinafter in this specification refers to the emoluments drawn by an employee. The emoluments include, but are not limited to, salary, retainer, compensation, bonus, and the like.

The term "computed emoluments" used hereinafter in this specification refers to emoluments calculated, with the help of the system of the present disclosure, that should be drawn by an employee based on his ranking within his team/organization.

The term "user" used hereinafter in this specification refers to a team lead, a manager, a concerned person, or an appraiser.

These definitions are in addition to those expressed in the art.

BACKGROUND

The background information herein below relates to the present disclosure but is not necessarily prior art.

In today's highly competitive world, all organizations expect and require their employees to be highly competent. For this, the employees are evaluated by the organizations. These evaluations also help in providing appraisals and determining employee promotions. Many organizations deploy a categorical grading based appraisal and compensation systems. For example, top performers receive A+ grade, next in line receive A grade, and the like. Employees are thus bucketed in categories of performance in the last appraisal period, and they receive slab based compensation revision and promotions based on which category they belong to. However, the conventional systems magnify the parity in pay scales compared to the true capabilities of the employees. Further, the conventional systems barely provide an opportunity to correct compensation errors in initial compensation offered to new joiners.

Further, the conventional systems include employee rating techniques which are based on a bell curve principle. In case of most of these conventional bell curve based systems, the employees are ranked on a fixed scale. That means only a fixed number of employees are force-fitted into a curve rating and ranked to be on top even if all the employees are of a similar caliber. This forces the managers/appraisers to fit the employees according to a set pattern. Further, employees may also have to endure subjective/absolute or biased ranking in the conventional systems. The managers/appraisers may be consciously or sub-consciously biased towards one employee and may rank them irrespective of their competency. The bias can be positive, negative, gender based, educational qualification based, personal preference based, cultural background based, and the like. Additionally, in the conventional systems, only hierarchy or years of experience/tenure is considered over capability of employees to rank them. All these techniques for ranking employees, used in the conventional systems can demoralize the employees, and can in turn result in less productivity thereby affecting overall growth of the organization.

Therefore, there is felt a need to provide a computer implemented appraisal system and method thereof that limits the aforementioned drawbacks.

OBJECTS

Some of the objects of the present disclosure, which at least one embodiment herein satisfies, are as follows:

An object of the present disclosure is to provide a computer implemented appraisal system.

Another object of the present disclosure is to provide a computer implemented appraisal system that facilitates objective ranking which limits biased ranking.

Yet another object of the present disclosure is to provide a computer implemented appraisal system that facilitates ranking of employees based on different discrete parameters.

Still another object of the present disclosure is to provide a computer implemented appraisal system that is auditable thereby eliminating biased appraisals.

Other objects and advantages of the present disclosure will be more apparent from the following description, which is not intended to limit the scope of the present disclosure.

SUMMARY

The present disclosure envisages a computer implemented appraisal system. The system comprises a repository, an analyzer, a ranking engine, a validation module, an autocorrection engine, and a computation module.

The repository is configured to store a set of pre-defined organization rules and a lookup table. The lookup table contains a list of employees, and actual emoluments, computed historical appraisal score values, employee details, and a set of pre-determined parameters corresponding to each of the employees, and a predicted weightage corresponding to each of the set of pre-determined parameters.

In an embodiment, set of pre-determined parameters is selected from the group consisting of on-time project deliverables, discipline, attentiveness, punctuality, obedience to an organization policies, technical knowledge, productivity, and quality of work.

The analyzer is configured to cooperate with the repository. The analyzer is further configured to analyze the stored employee details for each of the employees based on the set of pre-defined organization rules to generate a plurality of clusters of employees.

The ranking engine is configured to cooperate with the repository and the analyzer. The ranking engine comprises a matrix creator and a ranking module. The matrix creator is configured to create a matrix for each of the clusters of employees for each of the pre-determined parameters, and is further configured to populate each cell of the created matrix with a rating value by comparing a score value of each of the employees associated with the cell. Further, the ranking module is configured to cooperate with the matrix creator, and is also configured to generate a rank value for each of the employees of the created matrix based on the rating value.

The validation module is configured to cooperate with the ranking engine, and is further configured to identify at least one error or at least one occurrence of biasness by comparing the rank value of each employee with rank values of other employees of the created matrix. The autocorrection engine is configured to cooperate with the validation module. The autocorrection engine is configured to autocorrect the identified error using the computed historical appraisal score values and the set of pre-defined rules, and is further configured to update the created matrix.

The computation module is configured to cooperate with the repository and the ranking engine, and is further configured to compute emoluments for each of the employees based on the rank value, the actual emoluments, and the set of pre-defined organization rules.

The analyzer, the ranking engine, the validation module, the autocorrection engine, and the computation module are configured to be implemented using one or more processor(s).

In an embodiment, the autocorrection engine comprises an updater and a flag generator. The updater is configured to cooperate with the validation engine, and is further configured to autocorrect the identified error by updating the cell of the created matrix using the computed historical appraisal score values and the set of pre-defined rules. Further, the flag generator is configured to cooperate with the updater, and is further configured to generate a flag to indicate autocorrection of the rank value, The flag generator and the updater are configured to be implemented using one or more processor(s).

In an embodiment, the validation module is configured to generate an alert if biasness or error is identified.

In another embodiment, the system includes a prediction module. The prediction module is configured to predict the weightage of each of the set of pre-determined parameters using a best fit technique. The best fit technique is selected from the group consisting of a least square technique, a curve fitting technique, and a regression analysis technique, wherein the prediction module is configured to be implemented using one or more processor(s).

In an embodiment, the matrix creator comprises an input module, a comparator, and a populating module. The input module is configured to facilitate a user to provide the score value of each employees. The comparator is configured to cooperate with the input module, and is further configured to compare the score values of each of the employees associated with each cells of the created matrix to generate the rating value for each employee of the created matrix.

The populating module is configured to cooperate with the comparator, and is further configured to populate each cell of the created matrix with the rating value. The input module, the comparator, and the populating module are configured to be implemented using one or more processor(s).

In an embodiment, the matrix creator further includes a splitting module. The splitting module is configured to diagonally split the created matrix into an upper triangulation matrix and a lower triangulation matrix, wherein either of the upper triangulation matrix or the lower triangulation matrix is a non-editable triangulation matrix. The splitting module is configured to be implemented using one or more processor(s).

The present disclosure also envisages a computer implemented method for providing appraisal to employees.

BRIEF DESCRIPTION OF THE ACCOMPANYING DRAWING

The computer implemented appraisal system and method thereof, of the present disclosure will now be described with the help of the accompanying drawing, in which:

FIGS. 2A and 2B illustrate two matrices, one for each parameter, in accordance with one embodiment of the present disclosure.

LIST OF REFERENCE NUMERALS

| | |
|---|---|
| 100 | System |
| 102 | Repository |
| 104 | Analyzer |
| 106 | Ranking engine |
| 106a | Ranking module |
| 106b | Matrix creator |
| 108a | Input module |
| 108b | Comparator |
| 108c | Populating module |
| 108d | Splitting module |
| 110 | Validation module |
| 111 | Autocorrection engine |
| 111a | Updater |
| 111b | Flag generator |
| 112 | Computation module |
| 114 | Prediction module |

DETAILED DESCRIPTION

A computer implemented appraisal system of the present disclosure is described with reference to FIG. 1 of the accompanying drawing.

Figure 1:
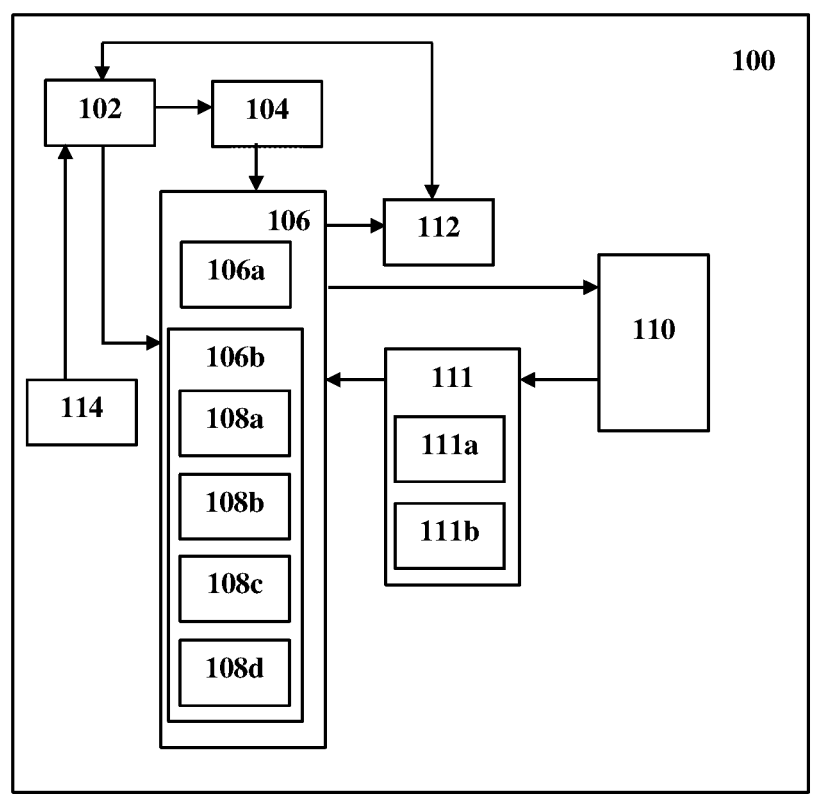
FIG. 1 illustrates a schematic block diagram of a computer implemented appraisal system.

FIG. 1 illustrates a block diagram of the computer implemented appraisal system (100) [hereinafter referred as "system"].

The system (100) includes a repository (102), an analyzer (104), a ranking engine (106), a validation module (110), an autocorrection engine (111), and a computation module (112).

The repository (102) is configured to store a set of pre-defined organization rules and a lookup table. The lookup table contains a list of employees, and actual emoluments, computed historical appraisal score values, employee details, and a set of pre-determined parameters corresponding to each of the listed employees, and a predicted weightage corresponding to each of the set of pre-determined parameters. In an embodiment, the employee details include a team to which an employee belongs, his/her superior/reviewer, his/her achievements or outstanding work, job responsibilities, and the like. The set of pre-determined parameters include the parameters on which the employees are rated include discipline, attentiveness, punctuality, obedience to an organization policies, technical knowledge, productivity, quality of work, and deliverables expected from the employees based on type of project(s) the employee is currently working on. In one embodiment, the weightage corresponding to each of the set of pre-determined parameters is pre-set by the organization. In another embodiment, the weightage is set by reverse calculations. In yet another embodiment, the set of pre-determined parameters and/or weightage of each of the pre-determined parameters is different for different teams/employees within same organization.

During the time of an appraisal cycle, the details of the employees of a particular team are provided to a team lead/manager along with the relevant parameters, based on which the team lead/manager has to rank his team members (employees). Before providing the list of employees to be ranked against each other for particular parameters, the analyzer (104) is configured to analyze the stored employee details for each of the employees based on the set of pre-defined organization rules stored in the repository (102). The analyzer is further configured to generate a plurality of clusters of employees based on the set of pre-defined organization rules.

In an embodiment, the analyzer (104) is configured to analyze the employee details, and generate clusters of employees working in a same team. In one embodiment, one cluster consists of 8-15 employees working under one team lead/manager, and preferably on a same project. The analyzer (104) is configured to analyze the stored employee details and provides the plurality of clusters of employees and respective parameters based on which they need to be ranked for appraisals. In one embodiment, the groups are formed based on certain rules of department, project, customer and project manager affinity. These rules are configurable. In another embodiment, employees can be shuffled between the groups based on pre-determined conditions. The pre-determined conditions include group size, seniority level, actual emoluments, and skills.

The ranking engine (106) is configured to cooperate with the repository (102) and the analyzer (104), and is further configured to generate a rank value for each of the employees of the clusters. The ranking engine (106) includes a matrix creator (106b) and a ranking module (106a). Once the clusters are created, the matrix creator (106b) is configured to create a matrix for each of the clusters of the employees for each of the pre-determined parameters. The matrix creator (106b) is further configured to populate each cell of the created matrix with a rating value by comparing the predicted weightage of each employees associated with the cell.

In an embodiment, the matrix creator (106b) includes an input module (108a), a comparator (108b), and a populating module (108c). The input module (108a) is configured to facilitate a user to provide score value for each employee. The comparator (108b) is configured to cooperate with the input module (108a), and is further configured to compare the score value of each of the employees associated with each cell of the created matrix to generate the rating value for each employee of the created matrix. Further, the populating module (108c) is configured to cooperate with the comparator (108b), and is further configured to populate each cell of the created matrix with the rating value.

The input module (108a), the comparator (108b), and the populating module (108c) are configured to be implemented using one or more processors.

In another embodiment, the matrix creator (106b) further includes a splitting module (108d). The splitting module (108d) is configured to diagonally split the created matrix into an upper triangulation matrix and a lower triangulation matrix, wherein either of the upper triangulation matrix or the lower triangulation matrix is a non-editable triangulation matrix. In an embodiment, the matrix creator (106b) is configured to populate the non-editable triangulation matrix based on the rating value of each of the employees.

The splitting module (108d) is configured to be implemented using one or more processor(s).

FIGS. 2A and 2B illustrate two matrices, one for each parameter, in accordance with one embodiment of the present disclosure. Each of the matrices comprises an array of employees in one group. One employee from this array can then be rated against all of the remaining employees from that group. Each matrix is then displayed on a display (not shown in figure).

The team lead/manager/concerned person/appraiser can then rate each employee against all the other employees from his group/team. In one embodiment, the rating that can be provided is objective, i.e., the appraiser can rate an employee, for parameters, against another employee only by selecting one of the three options viz. '>', '<', or '='. Here, '>' selection reflects that employee1 is better than employee2 when a particular parameter is considered. Similarly, '<' reflects that employee2 is better than employee1 when a particular parameter is considered. '=' indicates that both the employees employee1 and employee2 are at par in case of that particular parameter. In FIG. 2A, the parameter that is considered for rating the employees is 'Discipline' and in FIG. 2B, the parameter is 'Attentiveness'. Duplication and errors are avoided in the matrices by disabling and automatically filling the cells in the lower triangular matrices (grey cells in FIGS. 2A and 2B) based on the selections done in the cells in the upper triangular matrices. Based on the selections, rating values for the all the employees is calculated for each parameter, after which a ranked list is created by the ranking module (106a). If the employees are at par with each other, sub-parameters are considered for ranking. In one embodiment, there are separate matrices for sub-parameters. This technique of ranking the employees facilitates ranking based on capability and performance of employees rather than any bias or employee tenure. It is based on relativity rather than subjectivity.

The ranking module (106a) is configured to cooperate with the matrix creator (106b) to receive the created matrix. The ranking module (106a) is further configured to generate a rank value for each of the employees based on the rating values. In an embodiment, the ranking module (106a) is configured to identify predicted weightages of each of the parameters and also configured to cooperate with the matrix creator (106b) to receive the created matrix corresponding to different parameters with comparisons done by the appraiser. The ranking module (106a) based on these inputs, ranks the employees within the cluster. This ranking is objective as the appraiser does not rank the employee with a particular value, he just selects whether an employee is better than, at par, or less efficient than another employee. A ranked list is then created for every cluster based on all the relevant parameters.

A pseudo code for depicting functionalities of the analyzer (104), the ranking engine (106) is depicted below.

1. Select

```
    groupid, employeeid, parametername, (sizeofgroup − rank) * 2 + 1 as
points from
    employeepoints a,
    (select groupid, count(distinct employeeid) sizeofgroup from
    employeepoints group by groupid) b
Where
    a.groupid = b.groupid
    order by groupid, employeeid, parametername, rank desc
```

2. Get last appraisal score of each employee. If current one is first appraisal the convert is salary to score using some function,

```
If first appraisal then
        Score = SalaryToScore(salary). If units of score and salary are
same then SalaryToScore is just Identity function defined as
        Identity(x) = x
Else
        Score = lastappraisalscore
        (Else part is equivalent to following structured query)
        Select
                score
        from
                appraisalscores
        where
                appraisalmonthyearid = (select
max(appraisalmonthyearid) - 1 from appraisalscores)
```

3. For every group and for every parameter,
   a. Create sorted array of only appraisal points. Let's call it as PointsArray.
      Equivalent pseudo code is

```
   pointsArray=Sort([employee.points|employee in
           group])
   ``` b. Create another sorted array of only last time scores let's call it as inputscoreArray,
      Equivalent pseudo code is

```
   inputScoreArray=Sort([employee.lastscore|employee
           in group])
   ``` c. In inputScoreArray increase maxScore by preconfigured percentage called as push
      Equivalent pseudo code is

```
   inputScore[0]=inputScore[0]*(1.0+push/100.0)
   ``` d. In inputScoreArray decrease minScore by preconfigured percentage called as pull
      Equivalent code is

```
   inputScore[groupsize]=inputScore[groupsize]*(1.0-
           pull/100.0)
   ``` e. Create maximum, minimum and average constraint equations from pointsArray and inputScoreArray as follows

```
   // max constraint
   inputScoreArray [0] = A * pointsArray[0] *power( B, pointsArray[0])
   // min constraint
   inputScoreArray [groupsize] = A * pointsArray[groupsize] *power( B,
   pointsArray[groupsize]) -- min constraint
   // average constraint
   average(inputScoreArray) = average(for all points A * pointsArray
   [point] * power(B, pointsArray[point]))
   ``` where
      A and B are constants to find.
   f. Above equations are solved using heuristic approach,
      1. B is defaulted to value of 1.001
      2. Default lastAverageDiff to value of infinity
      3. Calculate average of inputscoreArray such that minimum score is subtracted from every score. Lets call it averageScore
         Equivalent pseudo code is

```
      minScore=Minimum(inputscoreArray)

averageScore=average([score-minscore|score in
              inputscoreArray])
      ```

4. For given B, find A using (max constraint–min constraint) equation.
      5. For given A and B find average of (average constraint–min constraint) equation. Lets call it is predictedaveragescore.
      6. Get the difference between averageScore and predictedaveragescore
      7. If this difference is zero then we have found A and B and exit.
      8. If this difference is lesser than or equal to lastAverageDiff then increase B by very small delta say 0.000001. Set lastAverageDiff to current difference. And go to step 4.
      9. Else if difference was more than lastAverageDiff then decrease B by very small delta say 0.000001. Set lastAverageDiff to current difference. And go to step 4.
   g. Calculate score of every employee in group for given parameter with following equation score=$A$*parameter-points*power($B$,parameter-points)

where value of A and B is determined above.
4. Based on weights of different parameters, calculated cumulative score of an individual in a group by using weighted average of parameter scores.
   Pseudo code is as follows,

```
   For every employee calculate,
   Summationofparameterweight = summation([parameter.parameterweight |
   parameter in evalauationparameters])
   Summationofweightedscore = summation([parameter.parameterweight *
   employee.parameter.points | parameter in evalauationparameters])
   Cummulativescore = Summationofweightedscore /
   Summationofparameterweight
   ```

The validation module (110) is configured to cooperate with the repository (102), and the ranking engine (106), and is further configured to identify at least one error or at least one occurrence of biasness by comparing the rank value of each employee with rank values of other employees of the created matrix. In an embodiment, the validation module (110) is configured to diagnose the identified biasness or error(s). For example, if an appraiser ranks employee1>employee2, and employee2>employee3, and then ranks employee1<employee3, then such error is highlighted.

In an embodiment, the validation module (110) is configured to periodically perform audit on the generated rank value to identify presence of error(s) or biasness.

The autocorrection engine (111) is configured to cooperate with the validation module (110). The autocorrection engine (111) is configured to autocorrect the identified error using the computed historical appraisal score values and the set of pre-defined rules. The autocorrection engine (111) is further configured to update the created matrix.

In an embodiment, the autocorrection engine (111) comprises an updater (111a) and a flag generator (111b). The updater (111a) is configured to cooperate with the validation module (110), and is further configured to autocorrect the identified error by updating the cell of the created matrix using the computed historical appraisal score values and the set of pre-defined rules. Further, the flag generator (111b) is configured to cooperate with the updater (111a), and is further configured to generate a flag to indicate autocorrected rank value(s). The flag generator (111b) and the updater (111a) are configured to be implemented using one or more processor(s).

In an embodiment, the user can manually update the rank value. Once these transitive errors or biasness is identified and corrected by the autocorrection engine (111), the list of ranked employees of the cluster is provided to the senior manager/appraiser's manager/concerned senior person. The senior manager then checks and approves the ranked list and the appraisals can take place according to the list, or if the senior manager does not agree with the rankings, he can modify the list by modifying the selections in the matrices via the input module (108a).

In an exemplary embodiment, the validation module is reducing probability of manager who is looking at resource as overall and accordingly adjusting input for different parameter. In such cases probability of resource getting same rank is higher.

A pseudo code depicting the functionality of validation module is explained below.

1. Excel Manipulation:

In order to avoid the probability of manager who is looking a particular resource as overall and accordingly adjusting input for different parameters then the probability of the resource getting same rank is higher

```
Set rankdiff = config value
Initialize the team table T(id,empid,paramid,points)
Sort the list based on team, parameter, points and employee
Loop team
    set empcnt = distinct employees in a team
    Loop Parameter
        Subroutine Calculate_employee_rank
        Subroutine store_employee_parameter_rank_value
    Set occurance = 0
    Loop employee
        Sort based on rank asc
        If (employee[i+1].rank – employee[i].rank) > rankdiff
            occurance = occurance + 1
        End
```

TeamRankOccurance=occurance/empcnt
Subroutine store_TeamRankOccurance_value
Sort team based on TeamRankOccurance
Filter top % config records 2. Salary Difference:

Basic check on input data, where junior people capability level should not be ranked so high then senior person so that new value generated cross threshold. Threshold value is loop back based on historical analysis and timeline based capability growth possibility.
Set salarydiffcompare=config value
Initialize the team table T(id,empid,newvalue,overallpoints)
Initialize the empinfo table E(empid,level)
Sort the list based on team, overall points

```
Loop team
    Set cnt = teamsize
    Set mismatch = 0
    Loop employee
        If employee[i].level > employee[i+1].level &&
[employee[i].newvlaue – employee[i+1].newvalue] >
salarydiffcompare
            mismatch = mismatch + 1
        End
    Subroutine store_TeamSalaryDiffMismatch_value
    Sort team based on Set tempseniouritylevel desc
```

3. Parameter Understanding:

Typically, capability of a resource should not deviate much for related parameters (e.g. interpersonal skills and communications skills). This validation is intended to check in which team such deviation is high.

Initialize the understanding table U(info,paramid)
Initialize the team table T(id,empid,paramid,points)
Sort the list based on team, parameter, points and employee

```
Loop team
    set empcnt = distinct employees in a team
    Loop Parameter
        Subroutine Calculate_employee_rank
        Subroutine store_employee_parameter_rank_value
    Loop infoparamarray
        filter employee data for parameters
        loop employee
            Set i = 0
            Set mindiff = empcnt
            Set maxdiff = 0
            loop parameters
                Set diff = employee[i].level
                if diff < mindiff
                    Set mindiff = diff
                if diff > maxdiff
                    Set maxdiff = diff
            Subroutine
            store_infoparam_team_mindiff_maxdiff_value
            TeamInfoParamUndersandingMax = Sum ([maxdiff]) / empcnt
    Subroutine store_TeamInfoParamUndersandingMax_value
Sort team based on TeamInfoParamUndersandingMax desc
Filter top %config records
```

4. PM Rank:

Typically, team distributions do not have much niche capability variation among all resources. For certain parameters, resource capability can have extremes. This validation helps in identifying which manager has used highest deviation.
Initialize the team table T(id,empid,paramid,points,rank)
Initialize the teambasic table TB(id,PMid)
Get Distinct PMs

```
Loop PMs
    Filter List (PMs)
    Loop Team
        Set cnt = teamsize
        Loop Employee
            Calculate StdDev(Rank)
        Set AvgDev = Sum(StdDev(employee))/cnt
        Subroutine store_Team_RankDev_Value
    Set PMDev = Sum(TeamAvgDev)/NoOfTeam
```

5. Designation Comparison:

Junior resource crossing multi-level senior resource in terms of capability for many parameters is less likely. This validation checks how much level crossing happened in team.
Initialize the team table T(id,empid,newvalue,overallpoints)
Initialize the team table E(empid,level)
Sort the list based on team, parameter, points

```
Loop team
    Set cnt = teamsize
    Loop Parameter
        Set i = 0
        Set mismatch = 0
        Loop employee
            If employee[i].level > employee[i+1].level &&
[employee[i].Point < employee [i+1].Point]
                mismatch = mismatch + (employee[i].level –
                employee[i+1].level)
            End
        Subroutine store_Team_parameter_Mismatch_value
        TeamDesignationMismatch = Sum ([mismatch]) / empcnt
    Sort team based on Set TeamDesignationMismatch desc
    Filter top %config records
```

The computation module (112), of the present disclosure, is configured to cooperate with the repository (102), and the ranking engine (106), and is further configured to compute emoluments for each of the employees based on their rank values, actual emoluments, and the set of pre-defined organization rules.

In an embodiment, the validation module (110) is configured to generate an alert if biasness or error is identified. In another embodiment, upon identifying biasness or error, the validation module (110) is configured to alert the higher authorities by notifying them. Extreme ranking deviations are stored in the repository (102) for future review for a pre-determined time period.

When the system (100) is used for the first time in an organization, the ranking on different parameters is used to find predicted weightage of different parameters and computed historical appraisal score values of the employees. In an embodiment, the system (100) includes a prediction module (114) configured to predict a weightage corresponding to each of the set of pre-determined parameters using a best fit technique. The best fit technique is selected from a group consisting of a least square technique, a curve fitting technique, and a regression analysis technique. Best fit for the following equations are used to find weightages of each of the pre-determined parameters:

$$A1*PE11+A2*PE12+ \ldots AN*PE1N=AE1$$

where, PE11 stands for computed emoluments of employee1 based on parameter 1;
PE12 stands for computed emoluments of employee1 based on parameter 2; and
AE1 stands for Actual emoluments of employee1.

$$A1*PE21+A2*PE22+ \ldots AN*PE2N=AE2$$

where, PE21 stands for computed emoluments of employee2 based on parameter 1;
PE22 stands for computed emoluments of employee 2 based on parameter 2; and
AE2 stands for actual emoluments of employee 2

A1, A2, ... AN are unknowns and correspond to weightages of 'n' parameters. These weightages are found so that the above equations best fit.

In one embodiment, if the system (100) is introduced in a company which is yet to hire employees, the weightages can be determined after a pre-set time period, for example after 6 months, or the weightages can be pre-decided based on company policies.

In an embodiment, the system (100) includes a pattern detector (not shown in figure). The pattern detector is configured to detect at least one pattern indicating bias or intentional manipulation, which change the outcomes of:
  ranking, favored an employee as a topper in each parameter, similarly an un-favored employee as bottom in all parameters;
  significant change in rank of a particular parameter for an employee as compared to last appraisal computation; and
  exhibiting gap in ranking feedback for an employee, provided by at least two users utilizing share bandwidth.

In one embodiment, the pattern detector is configured to detect the pattern by determining psychological ranking biases. In an embodiment, a supervisor can override any rankings given by a manager to neutralize the ranking biases.

In an embodiment, after detecting the pattern, the system (100) transmits the pattern to users for revalidation without specifying errors. If the pattern continues to exist or is magnified, the system (100) reduces a weightage of assessment done by the manager and assigns some weightage to the historical data, thereby minimizing the impact of bias or manipulation.

Further, the system (100) also generates an alert, if an employee is consistently rated as exceptional and then suddenly during one appraisal cycle his performance/ranking drops. This helps in highlighting suspicious cases. Furthermore, based on the rankings, the system (100) can help in identifying an employee's predicted valuation and actual valuation. Any disparity in the valuations can be handled by the concerned authority within the organization. Additionally, the system (100) also provides a cumulative ranking list which includes all the employees of all teams within the organization to avoid any disparity. Conventionally, in most of the organizations appraisal data is passive/dead once appraisal is over and only fraction of it is referred to later on. However, the system (100) of the present disclosure is used to identify capability indicator, i.e., computed emoluments valuation of the employees. This can then be used in day-to-day decisions for matching right person for a particular job and also in passing maximum value to customers/clients by removing inefficiencies. This technique helps in periodic implicit auditing of appraisal rankings. Further, the system (100) uses the rank value and the predicated weightage to arrive at the capability indicator with reference to employees of each of the clusters, and then merges the clusters with department wise or organization wise to infer universal capability indicators.

In an embodiment, the analyzer (104), the matrix creator (106b), the input module (108a), the comparator (108b), the populating module (108c), the splitting module (108d), the ranking module (106a), the ranking engine (106), the validation module (110), the computation module (112), the updater (111a), the flag generator (111b), the prediction module (114), and the pattern detector, are configured to be implemented using one or more processor(s).

In an embodiment, the system (100) includes a memory (not shown in figure) that is configured to store a set of pre-determined rules. The memory may include any computer-readable medium known in the art, including, for example, volatile memory, such as static random access memory (SRAM) and dynamic random access memory (DRAM), and/or a non-volatile memory, such as read only memory (ROM), erasable programmable ROM, flash memories, hard disks, optical disks, and magnetic tapes, and/or a cloud based storage (cloud storage). In an embodiment, the memory is configured to store predetermined rules related to ranking employees, comparing the employees, providing weightages to various parameters, and the like.

The processor is configured to cooperate with the memory to receive and process the set of pre-determined rules to obtain a set of system operating commands. The processor may be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute the set of predetermined rules stored in the memory to control modules of the system (100).

Figure 3:
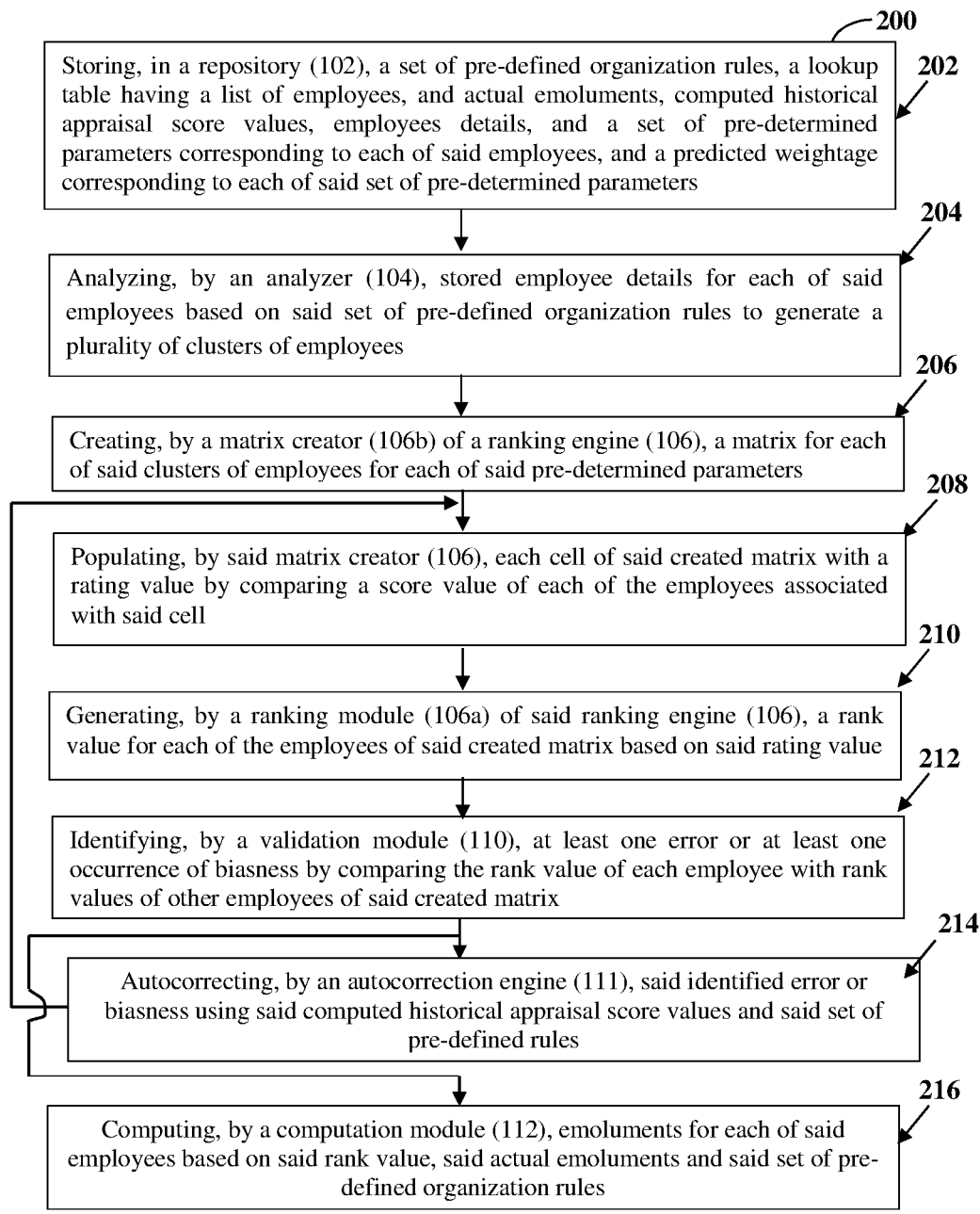
FIG. 3 illustrates a flow diagram showing steps performed by the computer implemented appraisal system of FIG. 1.

FIG. 3 illustrates a flow diagram showing steps performed by the computer implemented appraisal system (100), in accordance with an embodiment of the present disclosure. The method steps are as follows:

At block (202), storing, in a repository (102), a set of pre-defined organization rules, a lookup table having a list of employees, and actual emoluments, computed historical appraisal score values, employee details, and a set of pre-determined parameters corresponding to each of the employees, and a predicted weightage corresponding to each of the set of pre-determined parameters.

At block (204), analyzing, by an analyzer (104), stored employee details for each of the employees based on the set of pre-defined organization rules to generate a plurality of clusters of employees.

At block (206), creating, by a matrix creator (106b) of a ranking engine (106), a matrix for each of the clusters of employees for each of the pre-determined parameters.

At block (208), populating, by the matrix creator (106b), each cell of the created matrix with a rating value by comparing a score value of each of the employees associated with the cell.

At block (210), generating, by a ranking module (106a) of the ranking engine (106), a rank value for each of the employees of the created matrix based on the rating value.

At block (212), identifying, by a validation module (110), at least one error or at least one occurrence of biasness by comparing the rank value of each employee with rank values of other employees of the created matrix.

At block (214), autocorrecting, by an autocorrection engine (111), the identified error or biasness using the computed historical appraisal score values and the set of pre-defined rules.

At block (216), computing, by a computation module (112), emoluments for each of the employees based on the rank value, the actual emoluments and the set of pre-defined organization rules.

Technical Advancements

The present disclosure provides a technical solution to a technical problem. The conventional appraisal systems include employee rating techniques which are based on a bell curve principle. In case of most of these conventional bell curve based systems, the employees are ranked on a fixed scale. That means only a fixed number of employees are force-fitted into a curve rating, and ranked to be on top even if all the employees are of a similar caliber. This forces the managers/appraisers to fit the employees according to a set pattern. Further, employees may also have to endure subjective/absolute or biased ranking in the conventional systems. The managers/appraisers may be consciously or sub-consciously biased towards one employee and may rank them irrespective of their competency. The bias can be positive, negative, gender based, educational qualification based, personal preference based, cultural background based, and the like. Additionally, in the conventional systems, only hierarchy or years of experience/tenure is considered over capability of employees to rank them. All these techniques for ranking employees, used in the conventional systems can demoralize the employees, and can in turn result in less productivity thereby affecting overall growth of the organization.

The system as disclosed in the present disclosure provides a computer implemented appraisal system. The system as disclosed in the present disclosure facilitates objective ranking which limits biased ranking.

The system as disclosed in the present disclosure does not rank a particular employee based on his/her experience and tenure but automatically detects ranking of the employees based on their performance, historical information, and rating provided by the manager. Further, the system automatically detects error or biasness in ranking of the employee and rectifies the detected error in ranking using pre-defined rules so as to limit the biased ranking.

The system of the present disclosure employs a ranking engine, a validation module, and an autocorrection module. The ranking engine creates a matrix for a cluster of employees that represent a same team or a manager. The ranking engine is adapted to receive score values, from a user, for each of the employees of the matrix. The ranking engine compares the received score value of each of the employees associated with each cell of the created matrix, and populates each cell of the matrix with a rating value indicating performance difference between the employees associated with the populated cell of the matrix. Once, the entire matrix is populated the ranking engine generates a rank value for each of the employees of the matrix based on which future emolument of the employees is computed. The conventional methods of ranking do not disclose the aforementioned aspect of the present disclosure. The conventional methods only employ sorting based technique to rank employees considering only the rank value provided by the manager/appraiser and are therefore prone to errors and biasness.

The validation module and the autocorrection module, of the present disclosure, work in synchronization with the ranking engine. The validation module validates the ranking values generated by the ranking engine based on the received score values from the user. The validation module identifies presence of at least one error or biasness by comparing the rank value of each employee with rank values of other employees of the created matrix. Upon detecting error or biasness the autocorrection module automatically updates the cell of the matrix containing error using historical appraisal score value and the set of pre-defined rules, thereby limiting biased ranking. The conventional methods of validation are semi-automatic or manual wherein the user is required to manually rectify the errors detected by a validator which may lead to biasness. The system as disclosed in the present disclosure automatically validates, rectifies and notifies the user about presence of error(s) or biasness.

As compared to the conventional methods the system of the present disclosure is compatible with organizations of different sizes. The system of the present disclosure also computes the emolument of the employees in a time efficient manner which is not feasible with conventional manual or semi-automatic methods.

The disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A computer implemented appraisal system (100), said system (100) comprising:
 a repository (102) configured to store a set of pre-defined organization rules, a lookup table having a list of employees, and actual emoluments, computed historical appraisal score values, employee details, and a set of pre-determined parameters corresponding to each of said employees, and a predicted weightage corresponding to each of said set of pre-determined parameters;
 a prediction module (114) configured to predict said weightage of each of said set of pre-determined parameters using a best fit technique;
 an analyzer (104) configured to cooperate with said repository (102), said analyzer further configured to analyze said stored employee details for each of said employees based on said set of pre-defined organization rules to generate a plurality of clusters of employees;
 a ranking engine (106) configured to cooperate with said repository (102) and said analyzer (104), said ranking engine (106) comprising:
  a matrix creator (106b) configured to create a matrix for each of said clusters of employees for each of said pre-determined parameters, and further configured to populate each cell of said created matrix with a rating value by comparing a user-provided score value of each of the employees associated with said cell, said rating value indicating performance difference between the employees associated with the populated cell of the matrix, wherein the matrix creator (106b) comprises a splitting module (108d) configured to diagonally split the created matrix into an upper triangulation matrix and a lower triangulation matrix, wherein the cells in either of the lower triangulation matrix and the upper triangulation matrix of the created matrix are disabled for editing and automatically filled based on rating value to avoid duplication and errors; and
  a ranking module (106a) configured to cooperate with said matrix creator (106b), and further configured to generate a rank value for each of the employees of said created matrix based on said rating value and said predicted weightages;
 a validation module (110) configured to cooperate with said ranking engine (106), and further configured to identify at least one error or at least one occurrence of biasness by comparing the rank value of each employee with rank values of other employees of said created matrix;
 a pattern detector configured to detect at least one pattern indicating bias or intentional manipulation in the score values provided by a user;
 an autocorrection engine (111) configured to cooperate with said validation module (110), said autocorrection engine (111) configured to autocorrect said identified error or biasness using said computed historical appraisal score values and said set of pre-defined rules, wherein said autocorrection engine (111) comprises:
  an updater (111a) configured to cooperate with said validation module (110), and further configured to autocorrect said identified error by updating the cell of said created matrix using said computed historical appraisal score values and said set of pre-defined rules, wherein said updater (111a) is configured to transmit the detected pattern to the user for revalidation without specifying errors, and if the pattern continues to exist or is magnified, the updater (111a) is configured to reduce a weightage of the score values provided by the user and assign more weightage to the computed historical score values to minimize the impact of the detected bias or manipulation; and
  a flag generator (111b) configured to cooperate with said updater (111a), and further configured to generate a flag to indicate autocorrection of said rank value,
 a computation module (112) configured to cooperate with said repository (102) and said ranking engine (106), and further configured to compute emoluments for each of said employees based on said rank value, said actual emoluments, and said set of pre-defined organization rules,
 wherein said prediction module (114), said analyzer (104), said ranking engine (106), said validation module (110), said autocorrection engine (111), and said computation module (112) are configured to be implemented using one or more processor(s).

2. The system (100) as claimed in claim 1, wherein said set of pre-determined parameters is selected from the group consisting of on-time project deliverables, discipline, attentiveness, punctuality, obedience to an organization policies, technical knowledge, productivity, and quality of work.

3. The system (100) as claimed in claim 1, wherein said validation module (110) is configured to generate an alert if biasness or error is identified.

4. The system (100) as claimed in 1, wherein said best fit technique is selected from the group consisting of a least square technique, a curve fitting technique, and a regression analysis technique.

5. The system (100) as claimed in claim 1, wherein said matrix creator (106b) comprises:
 an input module (108a) configured to facilitate the user to provide said score value of each employees;
 a comparator (108b) configured to cooperate with said input module (108a), and further configured to compare said score value of each of the employees associated with each cells of said created matrix to generate said rating value for each employee of said created matrix; and
 a populating module (108c) configured to cooperate with said comparator (108b), and further configured to populate each cell of said created matrix with said rating value,
  wherein said input module (108a), said comparator (108b), and said populating module (108c) are configured to be implemented using one or more processor(s).

6. A computer implemented method (200) for providing appraisal to employees, said method (200) comprising the steps of:
 storing (202), in a repository (102), a set of pre-defined organization rules, a lookup table having a list of employees, and actual emoluments, computed historical appraisal score values, employee details, and a set of pre-determined parameters corresponding to each of said employees, and a predicted weightage corresponding to each of said set of pre-determined parameters, wherein said weightage of each of said set of pre-determined parameters is predicted by a prediction module (114) using a best fit technique;

analyzing (204), by an analyzer (104), stored employee details for each of said employees based on said set of pre-defined organization rules to generate a plurality of clusters of employees;

creating (206), by a matrix creator (106*b*) of a ranking engine (106), a matrix for each of said clusters of employees for each of said pre-determined parameters;

populating (208), by said matrix creator (106), each cell of said created matrix with a rating value by comparing a user-provided score value of each of the employees associated with said cell, said rating value indicating performance difference between the employees associated with the populated cell of the matrix, wherein the step of populating further comprises diagonally splitting, by a splitting module (108*d*), the created matrix into an upper triangulation matrix and a lower triangulation matrix, wherein the cells in either of the lower triangulation matrix and the upper triangulation matrix of the created matrix are disabled for editing and automatically filled based on rating value to avoid duplication and errors;

generating (210), by a ranking module (106*a*) of said ranking engine (106), a rank value for each of the employees of said created matrix based on said rating value and said predicted weightages;

identifying (212), by a validation module (110), at least one error or at least one occurrence of biasness by comparing the rank value of each employee with rank values of other employees of said created matrix;

detecting, by a pattern detector, at least one pattern indicating bias or intentional manipulation in the score values provided by a user;

autocorrecting (214), by an autocorrection engine (111), said identified error or biasness using said computed historical appraisal score values and said set of pre-defined rules, said step of autocorrecting (214) said identified error or biasness comprising:

autocorrecting, by an updater (111*a*), said identified error by updating the cell of said created matrix using said computed historical appraisal score values and said set of pre-pre-defined rules, wherein said step of autocorrecting comprises:

transmitting the detected pattern to the user for revalidation without specifying errors, and reducing a weightage of the score values provided by the user and assigning more weightage to the computed historical score values to minimize the impact of the detected bias or manipulation if the pattern continues to exist or is magnified;

generating, by a flag generator (111*b*), a flag to indicate autocorrection of said rank value; and computing (216), by a computation module (112), emoluments for each of said employees based on said rank value, said actual emoluments and said set of pre-defined organization rules.

\* \* \* \* \*